(12) United States Patent
Gorenflo

(10) Patent No.: US 9,650,945 B2
(45) Date of Patent: May 16, 2017

(54) COLLECTOR FOR MANIFOLD PIPES

(75) Inventor: Björn Gorenflo, Stutensee (DE)

(73) Assignee: TENNECO GMBH, Edenkoben (DE)

( * ) Notice: Subject to any disclaimer, the term of this patent is extended or adjusted under 35 U.S.C. 154(b) by 11 days.

(21) Appl. No.: 14/117,646

(22) PCT Filed: May 16, 2012

(86) PCT No.: PCT/EP2012/059140
§ 371 (c)(1),
(2), (4) Date: Nov. 14, 2013

(87) PCT Pub. No.: WO2012/156454
PCT Pub. Date: Nov. 22, 2012

(65) Prior Publication Data
US 2014/0075927 A1    Mar. 20, 2014

(30) Foreign Application Priority Data

May 18, 2011    (DE) .......................... 10 2011 101 947

(51) Int. Cl.
| | |
|---|---|
| *F01N 1/00* | (2006.01) |
| *F02B 27/04* | (2006.01) |
| *F01N 13/10* | (2010.01) |
| *F01N 13/14* | (2010.01) |
| *F01N 13/18* | (2010.01) |

(52) U.S. Cl.
CPC .............. *F02B 27/04* (2013.01); *F01N 13/10* (2013.01); *F01N 13/141* (2013.01); *F01N 13/143* (2013.01); *F01N 13/1888* (2013.01); *F01N 2530/00* (2013.01); *F01N 2530/04* (2013.01); *Y02T 10/146* (2013.01)

(58) Field of Classification Search
CPC ...... F02B 27/04; F01N 13/1805; F01N 13/10; F01N 13/143; F01N 13/1888; F01N 13/141; F01N 2530/00; F01N 2530/04; Y02T 10/146
USPC .................................................. 60/272–324
See application file for complete search history.

(56) References Cited

U.S. PATENT DOCUMENTS 4,689,952 A * 9/1987 Arthur .................... F01N 13/10
                                                       29/428
4,850,189 A * 7/1989 Arthur .................... F01N 13/10
                                                       60/313

(Continued)

FOREIGN PATENT DOCUMENTS

| DE | 39 25 802 A1 | 2/1991 |
|---|---|---|
| DE | 199 09 934 C1 | 1/2001 |

(Continued)

*Primary Examiner* — Phutthiwat Wongwian
*Assistant Examiner* — Kelsey Stanek
(74) *Attorney, Agent, or Firm* — Hudak, Shunk & Farine Co. LPA

(57) ABSTRACT

A collector for several manifold pipes of a motor vehicle carrying exhaust gas, including a first shell and a second shell, which can be connected to one another in a sealed manner by a shell connection that forms a connection plane (E), at least one outlet port for connecting to an exhaust pipe of an exhaust gas system, and several manifold pipe connection ports for connecting the manifold pipes, wherein the outlet port is designed as a rim hole within the respective shell and at least one first manifold pipe connection port is provided, which is designed as a rim hole within only one of the two shells.

17 Claims, 4 Drawing Sheets

(56) References Cited

U.S. PATENT DOCUMENTS

| | | | |
|---|---|---|---|
| 5,809,778 A | 9/1998 | Nording | |
| 6,009,706 A * | 1/2000 | Haneda | F01N 13/10 60/272 |
| 2005/0097886 A1* | 5/2005 | Geminn et al. | 60/323 |
| 2005/0183414 A1* | 8/2005 | Bien | F01N 13/10 60/323 |
| 2010/0112878 A1* | 5/2010 | White | F01N 3/2842 440/89 H |
| 2010/0126156 A1 | 5/2010 | Diez et al. | |

FOREIGN PATENT DOCUMENTS

| | | |
|---|---|---|
| DE | 101 12 707 C1 | 6/2002 |
| DE | 103 01 395 A1 | 7/2004 |
| EP | 0 748 928 A1 | 12/1996 |
| EP | 1 329 607 A2 | 7/2003 |
| EP | 2 184 462 A1 | 5/2010 |
| FR | 1 286 368 | 1/1962 |
| JP | 06 280557 A | 10/1994 |
| WO | 00 47878 A1 | 8/2000 |

\* cited by examiner

COLLECTOR FOR MANIFOLD PIPES

FIELD OF THE INVENTION

The invention relates to a collector or coupling element for several manifold pipes of a motor vehicle carrying exhaust gas, with a first shell and a second shell, which can be connected to one another in a sealed manner by means of a continuous material or form-fitting shell connection that forms a connection plane E, with at least one outlet port for connecting to an exhaust pipe of an exhaust gas system and with several manifold pipe connection ports for connecting the manifold pipes, wherein the outlet port is designed as a rim hole within the respective shell. The rim hole is configured as a hole, in contrast with a subsequently described configuration, and therefore confined to one shell. If there are several outlet ports, these and therefore the respective rim holes can be distributed on one shell or on both shells.

BACKGROUND OF THE INVENTION

EP 1 329 607 A2 specifies a hood manifold, whose gas carrying inner pipe manifold is formed from single-piece, T-shaped pipelines. Each time, the front pipeline adjoins the following pipeline. A collector for several manifolds is not described.

EP 0 748 928 B1 specifies a manifold collector arrangement formed from sheet metal shells, which has several manifold pipe connection ports formed by shaping of two sheet metal shells in the region of the connection plane for the connection of four manifold pipes and an outlet port formed by the sheet metal shells for connection to an exhaust pipe of an exhaust gas system.

DE 103 01 395 A1 likewise specifies a manifold collector formed from sheet metal shells, having several manifold pipe connection ports formed by shaping of two sheet metal shells in the region of the connection plane for the connection of four manifold pipes. The outlet port is formed as a rim hole within the lower sheet metal shell for connection to an exhaust pipe of an exhaust gas system.

SUMMARY OF THE INVENTION

The problem of the invention is to configure and arrange a collector such that space-saving connection geometries are assured.

The problem is solved according to the invention in that at least one manifold pipe connection port is provided, which is configured as a rim hole within only one of the two shells. Although the rim hole is somewhat more elaborate in terms of fabrication than a classical shaping in the region of the connection plane E, thanks to placement of the manifold pipe connection port with preferably a vertical spacing from the connection plane E it is possible to place the manifold pipe connection port at a different height of the collector, which affords substantially more flexibility for the manifold pipe and collector architecture. This also ensures a more compact and thus lighter construction of the manifold collector assembly on the whole. The shells are preferably sheet metal shells.

It can also be advantageous when at least one second manifold pipe connection port is provided, which is formed as a shaping of the two shells in the region of a shell margin and arranged in the connection plane E. Such a manifold pipe connection port is thus formed or enclosed by both shells. An additional manifold pipe connection port as a shaping guarantees the greatest possible flexibility in the arrangement of the manifold pipe connection port on the shells, and therefore for the architecture of the assembly as a whole, because the manifold pipe connection port can be arranged at different heights. The shaping differs from the rim hole in that it can be created during the deep drawing of one particular sheet metal shell by a half-round shaping of the two sheet metal shells in the shell margin. The rim hole within only one shell is based, on the contrary, on a removal of the shell material, which forms the opening of the rim hole. The connection plane E is preferably flat in configuration. Fundamentally, however, it can also be arched or corrugated, and therefore not flat in configuration. In this case, the manifold pipe connection ports arranged in the connection plane E would already be placed at different heights.

Moreover, it can be advantageous for two or three or four manifold pipe connection ports to be configured as rim holes and/or two or three or four manifold pipe connection ports as a shaping. The choice of the rim holes and shapings is arbitrary and should be chosen for the desired architecture.

It can be advantageously provided that one or more manifold pipe connection ports configured as a rim hole are arranged in the first and/or in the second shell. The choice of the shell is likewise arbitrary. Basically, a rim hole is also possible in the upper shell, so that the manifold is led into the collector from above.

If can be of special importance to the present invention if at least one manifold pipe connection port configured as a rim hole is configured as a common connection port for at least two manifold pipes. This enables an even more compact design.

In connection with the configuration and arrangement according to the invention, it can be advantageous when at least one manifold pipe connection port configured as a shaping is configured as a common connection port for at least two manifold pipes. The procedure itself is likewise familiar from the prior art, for example, from WO 00/47878 A1. However, a very compact design can be achieved in connection with a manifold rim hole.

It can also be advantageous if the outlet port is configured as a rim hole within only one of the two shells and the manifold pipe connection port likewise configured as a passage rim hole is arranged in the same shell. Thus, the rim holes can be confined to one shell, which overall leads to a very compact design.

Moreover, it can be advantageous if the shell or the shells are formed from sheet metal or configured as a cast iron piece. Sheet metal shells are on the whole less costly and lighter than cast iron shells.

Furthermore, it is advantageous if the shells and/or the manifold pipes are configured with one or two walls. With the two-wall design, manifold pipes insulated by air gaps can be connected accordingly.

The aforementioned advantages are also assured for a system consisting of a collector as described above with two interconnected shells and/or with manifold pipes connected thereto.

BRIEF DESCRIPTION OF THE DRAWINGS

Further advantages and details of the invention are explained in the patent claims and in the specification and represented in the figures. There are shown:

DETAILED DESCRIPTION OF THE INVENTION

Figure 1A:
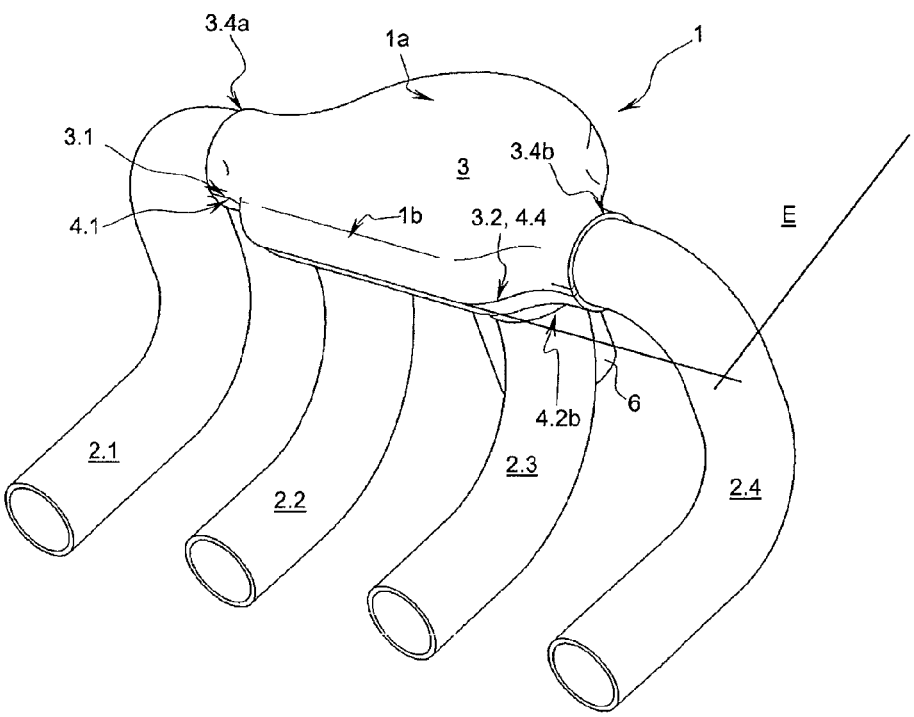
FIG. 1a a perspective view of a collector with four manifold pipes and four ports.

In the embodiment of FIG. 1a, four manifold pipes 2.1-2.4 are provided, which empty into a collector 1. Moreover, an exhaust pipe 6 is provided for an exhaust gas system (not shown), emerging from the collector 1. The four manifold pipes 2.1-2.4 are connected to a manifold flange (not shown).

The collector 1 is formed from two half-shells 3, 4 of sheet metal, each one having a shell margin 3.2, 4.4, which are connected by continuous material connection or by form fitting in gas-tight manner to a shell connection 3.1, 4.1 in a connection plane E. There are four manifold pipe connection ports 3.4a, 3.4b, 4.2a, 4.2b, to which the respective manifold pipe 2.1-2.4 is connected. While the manifold pipe connection ports 3.4a, 3.4b are formed as a semicircular shaping at the shell margin 3.2, 4,4 within the respective half-shells 3, 4, the manifold pipe connection ports 4.2a, 4.2b are configured as a rim hole within one half-shell, here, the lower half-shell 4. Therefore, the manifold pipe connection ports 3.4a, 3.4b are situated in the connection plane E, while the manifold pipe connection ports 4.2a, 4.2b are configured as part of the lower sheet metal shell 4 underneath the connection plane E and positioned there.

The collector 1 has a basic oblong shape, the manifold pipe connection ports 3.4a, 3.4b, 4.2a, 4.2b being grouped alongside each other at its rear part 1a. At a front part 1b of the collector 1 are arranged the rim hole 5 and the exhaust pipe 6. Thus, the manifold pipes 2.2, 2.3 are joined to the collector 1 or the lower shell 4 from underneath in a direction perpendicular to the connection plane E. The other manifold pipes 2.1, 2.4 are joined to the collector 1 in a direction parallel to the connection plane E.

Thus, the necessary space requirement is divided between the region in the connection plane E, i.e., about the periphery of the collector 1, and the region underneath the connection plane E, directly in the sheet metal shell 4.

Figure 2A:
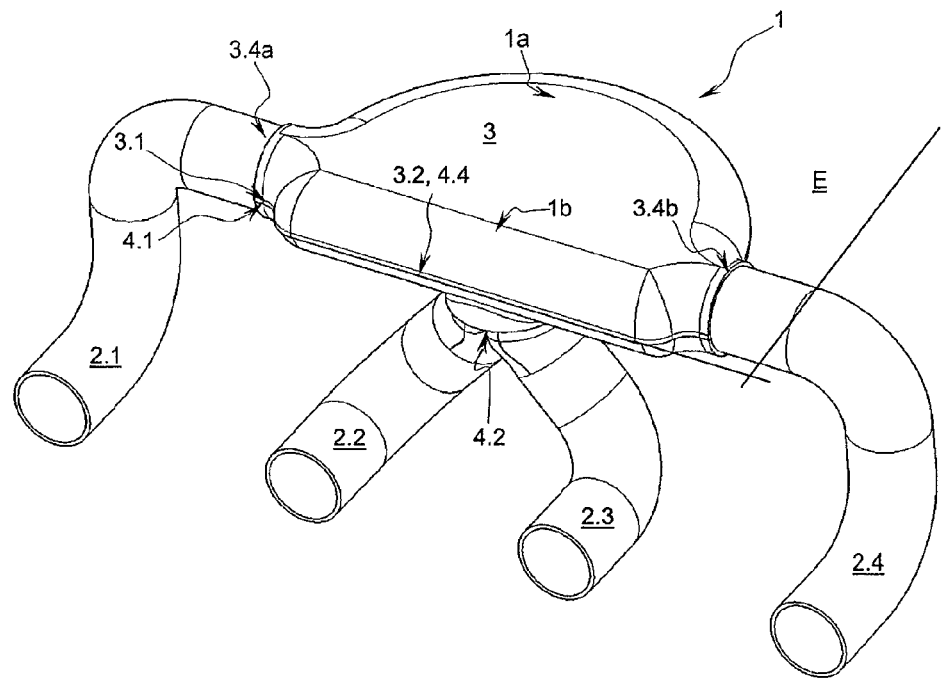
FIG. 2a a perspective view of a collector with four manifold pipes and three ports.
Figure 2B:
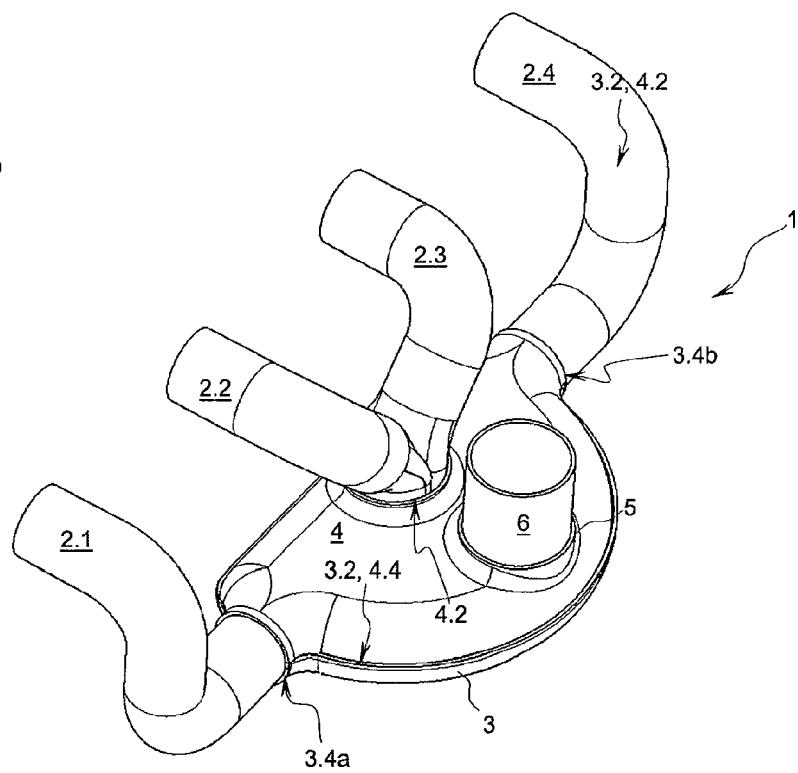
FIG. 2b an embodiment per FIG. 2a seen from below.

By the embodiment in FIG. 2a, 2b, a common rim hole 4.2 for the manifold pipes 2.2, 2.3 is provided within the lower half-shell 4. The manifold pipes 2.2, 2.3 empty in the collector 1 two in one, so to speak. The common manifold pipe connection port 4.2 formed in this way is larger in diameter than the respective single manifold pipe connection ports 4.2a, 4.2b and somewhat smaller than the rim hole 5 for the exhaust pipe 6.

Figure 1B:
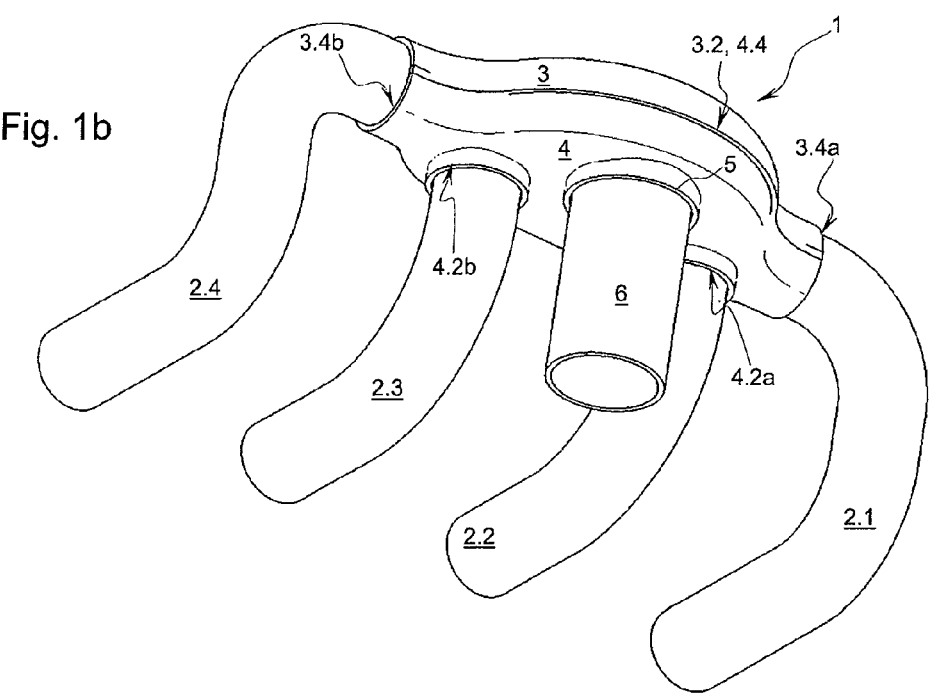
FIG. 1b an embodiment per FIG. 1a seen from below.
Figure 3:
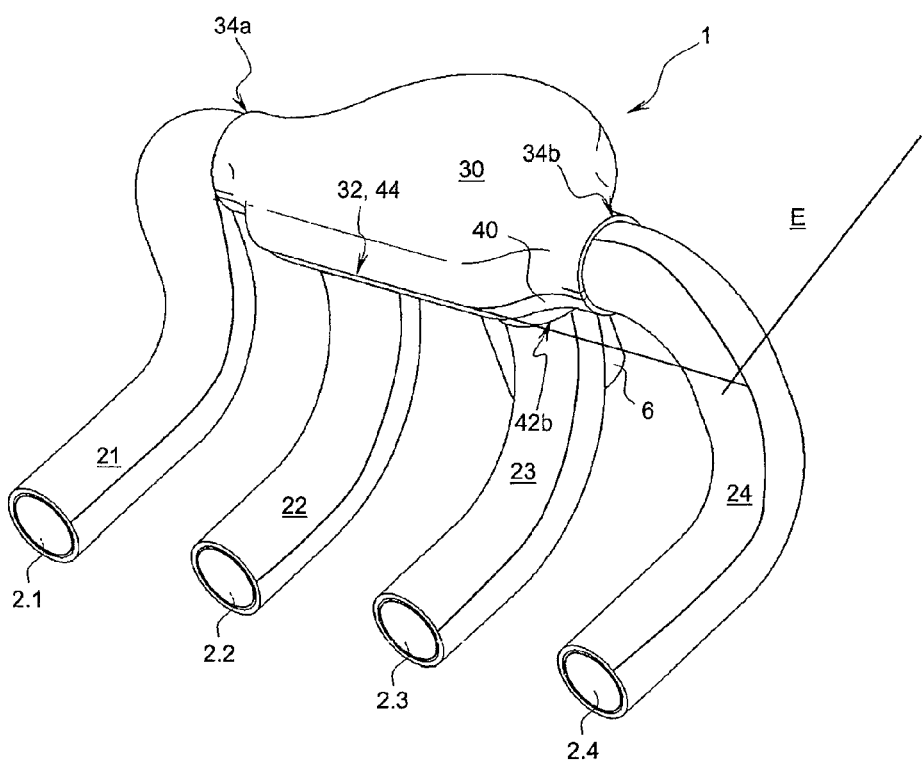
FIG. 3 a two-wall design of FIG. 1.
Figure 4:
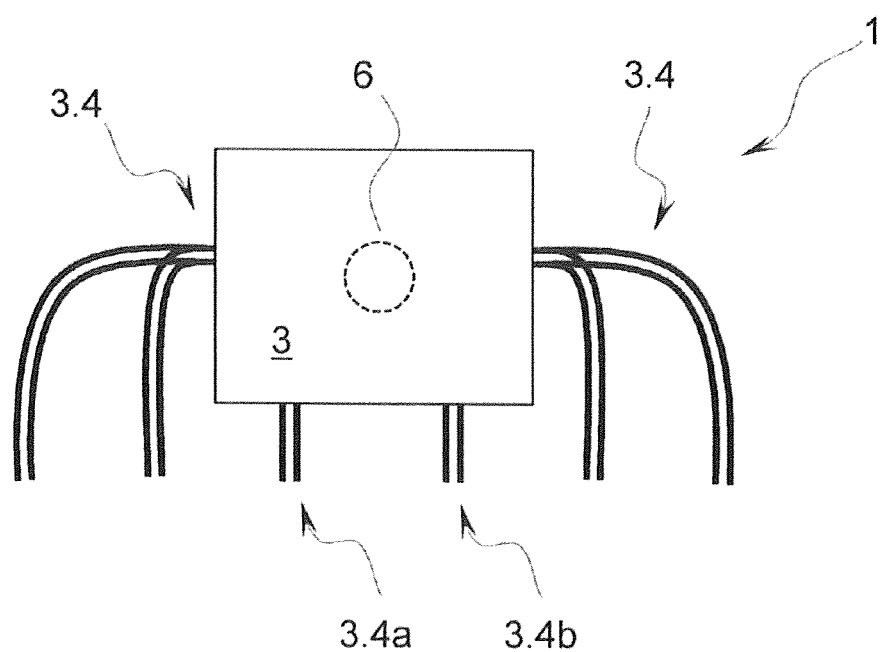
FIG. 4 is a schematic view showing at least one manifold pipe connection port configured as a common connection port for at least two manifold pipes.

By the embodiment of FIG. 3, the collector 1 which is known from FIG. 1 is fashioned with two walls in the LSI-configuration.

The two outer shells 30, 40 are arranged about the inner shells 3, 4 and joined gas-tight in a continuous material connection or form fitting connection in the connection plane E. The four manifold pipes 21-24 are fashioned as split outer shells and enclose the manifold pipes 2.1-2.4. The manifold pipe connection ports 34a, 34b are likewise formed as a shaping on the shell margin 32, 44, while the manifold pipe connection port 42b is configured as a rim hole within the second outer shell 40. The exhaust pipe 6 can likewise have a two-wall design.

Since the outer shells described here are connected gas-tight, a gas-tight connection between the half-shells 3, 4 on the one hand and the manifold pipes 2.1-2.4 on the other is not necessary.

LIST OF REFERENCE NUMBERS

1 Collector, coupling element
1a Rear part
1b Front part
2.1 Manifold pipe
2.2 Manifold pipe
2.3 Manifold pipe
2.4 Manifold pipe
3 First shell, metal shell
3.1 Shell connection
3.2 Shell margin
3.4a Manifold pipe connection port, shaping
3.4b Manifold pipe connection port, shaping
4 Second shell, metal shell
4.1 Shell connection
4.2 Common manifold pipe connection port, rim hole
4.2a Manifold pipe connection port, rim hole
4.2b Manifold pipe connection port, rim hole
4.4 Shell margin
5 Outlet port, rim hole
6 Exhaust pipe
21 Manifold pipe, outer shell
22 Manifold pipe, outer shell
23 Manifold pipe, outer shell
24 Manifold pipe, outer shell
30 First outer shell
32 Shell margin
34a Manifold pipe connection port, shaping
34b Manifold pipe connection port, shaping
40 Second outer shell
42b Manifold pipe connection port, rim hole
44 Shell margin
E Connection plane

What is claimed is:

1. A collector for several manifold pipes of a motor vehicle carrying exhaust gas, comprising:
   the collector formed from two half-shells provided as a first shell formed of one part and a second shell formed of one part, which are connected to one another in a sealed manner by a shell connection that forms a connection plane E, with at least one outlet port for connecting to an exhaust pipe of an exhaust gas system and with several manifold pipe connection ports for connecting the manifold pipes, wherein the manifold pipes are different than the collector, wherein the outlet port is designed as a rim hole within one of the first shell or the second shell,
   wherein at least one first manifold pipe connection port is provided, which is designed as a rim hole within only one of the two shells the shell of the outlet port, and arranged at a vertical spacing from the connection plane E, and wherein at least one second manifold pipe connection port is provided, which is formed as a shaping of the two shells in the region of a shell margin and arranged in the connection plane E.

2. The collector according to claim 1, wherein two or three or four manifold pipe connection ports are configured as rim holes or two or three or four manifold pipe connection ports as a shaping.

3. The collector according to claim 2, wherein the at least one manifold pipe connection port configured as a rim hole is configured as a common connection port for at least two manifold pipes.

4. A system, consisting of: a collector according to claim 3, with two interconnected shells or with manifold pipes connected thereto.

5. The collector according to claim 2, wherein the at least one manifold pipe connection port configured as a shaping is configured as a common connection port for at least two manifold pipes.

6. A system, consisting of: a collector according to claim 2, with two interconnected shells or with manifold pipes connected thereto.

7. The collector according to claim 1, wherein the one or more manifold pipe connection ports configured as a rim hole are arranged in the first or in the second shell.

8. The collector according to claim 1, wherein the shells are formed from sheet metal or configured as a cast iron piece.

9. The collector according to claim 1, wherein the shells or the manifold pipe are configured with one or two walls.

10. A system, consisting of: a collector according to claim 1, with two interconnected shells or with manifold pipes connected thereto.

11. The collector according to claim 1, wherein two or three or four manifold pipe connection ports are configured as rim holes or two or three or four manifold pipe connection ports as a shaping.

12. The collector according to claim 11, wherein one or more of the manifold pipe connection ports configured as a rim hole are arranged in the first or in the second shell.

13. The collector according to claim 12, wherein at least one of the manifold pipe connection port configured as a rim hole is configured as a common connection port for at least two manifold pipes.

14. The collector according to claim 12, wherein the at least one manifold pipe connection port configured as a shaping is configured as a common connection port for at least two manifold pipes.

15. A collector for several manifold pipes of a motor vehicle carrying exhaust gas, comprising:
the collector formed from two half-shells provided as a first shell formed of one part and a second shell formed of one part, which are connected to one another in a sealed manner by a shell connection that forms a connection plane E, with at least one outlet port in only one of said shells for connecting to an exhaust pipe of an exhaust gas system and with several manifold pipe connection ports for connecting the manifold pipes, wherein the manifold pipes are different than the collector, wherein the outlet port is designed as a rim hole within one of the first shell or the second shell,
wherein at least one first manifold pipe connection port is provided, which is designed as a rim hole within only one of the two shells the shell of the outlet port, and arranged at a vertical spacing from the connection plane E, and wherein at least one second manifold pipe connection port is provided, which is formed as a shaping of the two shells in the region of a shell margin and arranged in the connection plane E.

16. A collector for several manifold pipes of a motor vehicle carrying exhaust gas, comprising:
the collector formed from two half-shells provided as a first shell formed of one part and a second shell formed of one part, which are connected to one another in a sealed manner by a shell connection that forms a connection plane E, with at least one outlet port for connecting to an exhaust pipe of an exhaust gas system and with several manifold pipe connection ports for connecting the manifold pipes, wherein the manifold pipes are different than the collector, wherein the outlet port is designed as a rim hole within one of the first shell or the second shell,
wherein at least one first manifold pipe connection port is provided, which is designed as a rim hole within only one of the two shells, the shell of the outlet port, and wherein at least one second manifold pipe connection port is provided, which is formed as a shaping of the two shells in the region of a shell margin and arranged in the connection plane E, wherein the at least one second manifold pipe connection port formed as the shaping is situated in the connection plane E, while the at least one first manifold pipe connection port designed as the rim hole is positioned underneath the connection plane E.

17. A collector of a motor vehicle carrying exhaust gas and several curved manifold pipes, comprising:
the collector formed from two half-shells provided as a first shell formed of one part and a second shell formed of one part, which are connected to one another in a sealed manner by a shell connection that forms a connection plane E, with at least one outlet port for connecting to an exhaust pipe of an exhaust gas system and with several manifold pipe connection ports for connecting the manifold pipes, wherein the manifold pipes are different than the collector, wherein the outlet port is designed as a rim hole within one of the first shell or the second shell,
wherein at least one first manifold pipe connection port is provided, which is designed as a rim hole within only one of the two shells, the shell of the outlet port, and wherein at least one second manifold pipe connection port is provided, which is formed as a shaping of the two shells in the region of a shell margin and arranged in the connection plane E, wherein one of the manifold pipes is connected to the at least one first manifold connection port and one of the manifold pipes is connected to the at least one second manifold pipe connection port.

* * * * *